United States Patent Office 3,840,573
Patented Oct. 8, 1974

3,840,573
2-(3-HYDROXY - 3 - OPTIONALLY ALKYLATED-1-ALKYNYL) - 3 - HYDROXY-5-OXYGENATED CYCLOPENT - 1-ENEALKANOIC ACIDS, OPTICAL ISOMERS THEREOF AND ESTERS CORRESPONDING
Christopher J. Jung, Morton Grove, and Raphael Pappo, Skokie, Ill., assignors to G. D. Searle & Co., Chicago, Ill.
No Drawing. Continuation-in-part of abandoned application Ser. No. 100,420, Dec. 21, 1970, which is a continuation-in-part of application Ser. No. 739,159, June 24, 1968, now Patent No. 3,558,682. This application June 12, 1972, Ser. No. 261,642
Int. Cl. C07c 61/32, 61/36, 69/74
U.S. Cl. 260—410.9 R       13 Claims

ABSTRACT OF THE DISCLOSURE

The above-captioned compounds are prepared by a series of reactions beginning with the condensation of 9-oxodecanoic acid or 10-oxoundecanoic acid with dimethyl oxalate to afford the 2,3,5-trioxo-4-methoxalylcyclopentenealkanoic acids. The cyclopentanealkanoic acids are allowed to react in a sequence of steps to afford the 2-methoxy - 4 - methoxymethoxy - 5 - oxocyclopentenealkanoic acids. Treatment of the latter compounds with 3-optionally alkylated - 3 - [tetrahydropyran-2'-yl]oxy-1-alkynyl magnesium bromides followed by decomposition of the Grignard adduct and ether cleavage affords the instant 2-(3 - hydroxy - 3 - optionally alkylated-1-alkynyl)-3-hydroxy - 5 - oxocyclopent-1-enealkanoic acids. Those compounds are useful pharmacologically as hypotensive, antiulcerogenic and smooth muscle-stimulating agents.

---

This is a continuation-in-part of our application Ser. No. 100,420, filed Dec. 21, 1970, now abandoned, which is a continuation-in-part of our application Ser. No. 739,-159, filed June 24, 1968, now U.S. Pat. No. 3,558,682.

The present invention is concerned with novel cyclopentenealkanoic acid derivatives, and more particularly, with 2-((3RS) 3-hydroxy-3-(optionally alkyl)-1-alkynyl)-3 - hydroxy - 5-oxygenated cyclopent-1-enealkanoic acids, their levorotatory and dextrorotatory enantiomores and their corresponding lower alkyl esters. Those compounds are represented by the following structural formula

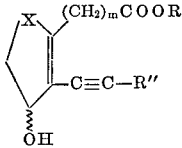

wherein R is hydrogen or a lower alkyl radical, R″ is a 1-hydroxycyclopentyl radical, a 1-hydroxycyclohexyl radical or a radical of the formula

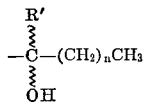

with R′ being hydrogen or a lower alkyl radical containing 1 to 7 carbon atoms and $n$ being an integer greater than 1 and less than 7, X is a carbonyl or hydroxymethylene radical, $m$ is an integer greater than 5 and less than 8 and the wavy lines represent the (R) or (S) configurations or the racemic mixtures.

The lower alkyl radicals comprehended in the above formula are methyl, ethyl, propyl, butyl, pentyl, hexyl, heptyl and the branched-chain isomers corresponding.

The instant compounds of this invention are produced by a series of reactions which begins with the condensation of 9-oxodecanoic acid or 10-oxoundecanoic acid with dimethyl oxalate in the presence of tertiarybutoxide. That reaction affords the corresponding 2,3,5-trioxo-4-methoxalylcyclopentanealkanoic acids, which upon cleavage of the alkoxalyl function by heating with a mineral acid, yield the triketo compounds. Those compounds can be reduced at the 3-position with a palladium catalyst in a neutral medium, such as aqueous isopropyl alcohol, or with sodium borohydride to afford the appropriate 2,5-dioxo-3-hydroxycyclopentanealkanoic acids. Contacting the acids with 2,2-dimethoxypropane and methanolic hydrogen chloride produces the methyl 2 - methoxy - 4-hydroxy - 5 - oxocyclopent-1-enealkanoates, and subsequent treatment with N,N-diisopropylethylamine and chloromethyl methyl ether yields the methyl 2-methoxy-4-methoxymethoxy - 5 - oxocyclopent-1-enealkanoates. The esters are saponified with sodium hydroxide and the resulting sodium salts are acidified to give the free acids, i.e. the 2-methoxy - 4 - methoxymethoxy - 5-oxocyclopent-1-enealkanoic acids. Those compounds are allowed to react further with Grignard reagent, i.e. 3-optionally alkylated-3 - [tetrahydropyran-2'-yl]oxy-1-alkynyl magnesium bromide, and the Grignard adduct which form then is decomposed to yield the 5-hydroxy-5-(3-[tetrahydropyran-2 - yl]oxy - 3-optionally alkylated-1-alkynyl)-4-methoxymethoxy - 2-methoxycyclopent-1-enealkanoic acids. After acidic cleavage of the ether functions, there is obtained 2 - (3 - hydroxy-3-optionally alkylated-1-octynyl)-3-hydroxy - 5 - oxocyclopent-1-eneheptanoic acid when the starting material is 9-oxodecanoic acid, and 2-(3-hydroxy-3 - optionally alkylated - 1 - octynyl)-3-hydroxy-5-oxocyclopent-1-eneoctanoic acid when the starting material is 10-oxoundecanoic acid.

Typical of the above sequence of reactions is that employed to produce 2-(3-hydroxy-1-octynyl)-3-hydroxy-5-oxocyclopent - 1 - eneheptanoic acid. Therein, 9-oxodecanoic acid is condensed with dimethyl oxalate in the presence of tertiary-butoxide to afford 2,3,5-trioxo-4-methoxalylcyclopentaneheptanoic acid. Cleavage of the alkoxalyl function by heating with hydrochloric acid, thus yielding the triketo compound, is followed by reduction with a palladium catalyst in aqueous isopropyl alcohol to afford 2,5 - dioxo - 3-hydroxycyclopentaneheptanoic acid. That acid is contacted with 2,2-dimethoxypropane and methanolic hydrogen chloride to produce methyl 2-methoxy - 4 - hydroxy-5-oxocyclopent-1-eneheptanoate. Subsequent treatment with N,N-diisopropylethylamine and chloromethyl methyl ether yields methyl 2 - methoxy - 4-methoxymethoxy - 5 - oxocyclopent - 1 - eneheptanoate, which may be saponified with sodium hydroxide to afford the sodium salt. That salt is acidified to yield the free acid 2 - methoxy - 4-methoxymethoxy-5-oxocyclopent-1-eneheptanoic acid. Treatment of that compound with 3-tetrahydropyran-2'-yloxy-1-octynyl magnesium bromide followed by decomposition of the Grignard adduct affords 5-hydroxy-5-(3-tetrahydropyran-2'-yloxy-1-octynyl)-4 - methoxymethoxy - 2-methoxycyclopent-1-eneheptanoic acid. Then the ether functions are cleaved by reaction with acid, thus yielding 2 - (3 - hydroxy-1-octynyl)-3-hydroxy-5-oxocyclopent-1-eneheptanoic acid.

The dextrorotatory and levorotatory enantiomers are prepared by employing the (3R) or (3S) 3-optionally alkyl-3(tetrahydropyran-2'-yl)oxy-1 - octynyl magnesium bromide as the Grignard reagent, respectively.

Alternatively, the compounds of this invention may be produced more directly by saponification of methyl 2-methoxy-4-hydroxy - 5 - oxocyclopent - 1 - enealkanoates with sodium hydroxide followed by acidification to yield the 2-methoxy-4-hydroxy-5-oxocyclopent-1 - enealkanoic acids. Reaction as above with the previously mentioned Grignard reagent and decomposition of the Grignard adduct affords the 2-(3-hydroxy-3-alkyl-1-octynyl)-3- hydroxy-5-oxocyclopent-1-enealkanoic acids. For example, methyl 2-methoxy-4-hydroxy-5-oxocyclopent-1-eneheptanoate is saponified with sodium hydroxide and then acidified to yield 2-methoxy-4-hydroxy-5-oxocycloclopent-1-eneheptanoic acid. Allowing that compound to react with 3-tetrahydropyran-2'-yloxy-1-octynyl magnesium bromide, decomposing the resulting Grignard adduct, and cleaving the resulting ether functions yields 2-(3-hydroxy-1-octynyl)-3-hydroxy-5 - oxocyclopent - 1-eneheptanoic acid.

The lower alkyl ester derivatives of the above acids are conveniently prepared by contacting the acid with a suitable esterifying agent. Such a reaction is typified by the treatment of 2-(3-hydroxy-1-octynyl)-3-hydroxy-5-oxocyclopent-1-eneheptanoic acid with diazomethane, yielding methyl 2-(3-hydroxy-1-octynyl)-3-hydroxy - 5 - oxocyclopent-1-eneheptanoate.

The instant 5-hydroxy compounds are produced by reducing the 5-keto compounds with sodium borohydride. In that manner, when 2-(3-hydroxy-1-octynyl)-3-hydroxy-5-oxocyclopent-1-eneheptanoic acid is treated with sodium borohydride in a methanolic sodium hydroxide solution, there is afforded 2-(3-hydroxy-1-octynyl)-3,5-dihydroxycyclopent-1-eneheptanoic acid.

The cyclopentyl and cyclohexyl derivative encompassed by this invention are prepared by using the appropriate 1-ethynylcycloalkan-1-ol 1 - tetrahydropyranyl ether in the preparation of the Grignard reagent and then proceeding in the same manner as described above. Thus, when the Grignard reagent formed from magnesium bromide and 1-ethynylcylohexan-1-ol 1-tetrahydropyran-2'-yl ether is contacted with 4-hydroxy-2-methoxy-5-oxocyclopent-1-eneheptanoic acid in the manner described previously, there is afforded 3-hydroxy-2-(2-[1-hydroxycyclohexyl]ethynyl)-5-oxocyclopent-1-eneheptanoic acid.

The novel compounds of the present invention possess valuable pharmacological properties. The hypotensive property of the instant compounds is determined as follows:

Male Charles River rats weighing 100–350 g. are used. Each animal is anesthetized by intraperitoneal injection of 1.5 g./kg. of urethane, whereupon cardiovascular reflexes are blocked by subcutaneous injection of 3 mg. of atropine sulfate dissolved in 0.3 ml. of aqueous 0.85% sodium chloride and sensitization is induced by subcutaneous injection of 5 mg. of pentolinium tartrate dissolved in 1 ml. of aqueous 0.85% sodium chloride. The trachea is intubated and both femoral veins and a carotid artery are cannulated, the latter being connected to a calibrated transducer, amplifier and recorder. After surgery, 5 mg./kg. of heparin sodium is introduced via one of the venus cannulae as a 2% solution in aqueous 0.85% sodium chloride and rectal temperature is adjusted to 35° C. by means of a regulator and external heat source. When the animal's blood pressure and temperature have stabilized, a high and low dose, with a ratio of high dose to low dose of 2:1, of the test compound and a high and low dose, also in a ratio of 2:1, of the standard prostaglandin $E_2$ are individually administered intravenously and in a random pattern and the blood pressure measured after each injection. The blood pressure of the animal is permitted to return to normal between successive injections. The relative potency of the test compound compared to the standard prostaglandin $E_2$ is determined by a 4-point bioassay using a randomized block design. The results are analyzed by the method of C. I. Bliss, *The Statistics of Bioassay*, Academic Press, New York (1952).

The smooth muscle-stimulating property of the instant compounds of the present invention is shown by the following assays:

A segment of one of the uterine horns of a freshly killed rat is removed after determining that the rat is in the diestrus phase of the ovarian cycle by microscopic examination of a vaginal washing. The segment is mounted in a 2 ml. tissue bath containing de Jalon solution maintained at 37° C. and bubbled with a gaseous mixture of 95% oxygen and 5% carbon dioxide. Longitudinal contractions of the tissue elicited by 1 mcg./ml. and 2 mcg./ml. of the test compound are measured isotonically and compared to those elicited by 0.1 mcg./ml. and 0.2 mcg./ml. of a standard preparation of prostaglandin $E_2$. The relative potency of the test compound compared to the standard prostaglandin preparation is determined by a 4-point bioassay using a randomized block design. Results are analyzed by the aforementioned method of Bliss.

A segment of duodenum from a freshly killed rabbit is mounted in a 4 ml. tissue bath containing Tyrode solution maintained at 37° C., through which is bubbled a gaseous mixture of 95% oxygen and 5% carbon dioxide. Longitudinal contractions of the tissue educed by 0.625 mcg./ml. and 1.25 mcg./ml. of the test compound are measured isotonically and compared to those educed by 0.025 mcg./ml. and 0.05 mcg./ml. of standard preparation of prostaglandin $E_2$. The relative potency of the test compound compared to that of the standard is determined by a 4-point bioassay using a randomized block design, and results are analyzed by the aforementioned method of Bliss.

A segment of distal ileum from a freshly killed guinea pig is mounted in a 2 ml. tissue bath containing modified Tyrode solution with ½ of the usual concentration of magnesium ions. The temperature is maintained at 37° C. and the solution is bubbled with a gaseous mixture of 95% oxygen and 5% carbon dioxide. Longitudinal contraction of the tissue elicited by 5 mcg./m. and 10 mcg./ml. of the test compound are measured isotonically and compared to those elicited by 0.05 mcg./ml. and 0.1 mcg./ml. of a standard preparation of prostaglandin $E_2$. The relative potency of the test compound is determined by procedure of Bliss described above.

The anti-ulcerogenic property of the instant compounds is demonstrated by their ability to inhibit the ulceration reported by Shay et al., *Gastroenterology*, 5, 43, (1945), to occur in rats subjected to fasting and pyloric ligation. In this test, male Charles River rats weighing 200–250 g. and fasted 72 hours prior to ligation are used. Immediately following ligation, the prescribed does of compound, dissolved or suspended in 1.0 ml. of pH 2.0 hydrochloric acid is interagastrically administered to each of a group of six animals. An initial dose of 50 mg. per kg. of body weight is normally employed. A like group of animals to which is identically and concurrently administered the acid alone serves as control. Precisely 19 hours later the stomachs of surviving animals are excised and examined under 5× magnification. The number of ulcers occurring in a non-secretory portion of each stomach is counted in four groups according to size, i.e. less than 2 mm., 2–4 mm., 4–8 mm. and greater than 8 mm. Each rat is then assigned a score, $z$, which is a weighted average of the logarithms of the ulcer counts in several size groups determined by a formula found approximately optimal by discriminant function analysis to be as follows:

$z = 20.00 \log (N_1+1) + 0.22 \log (N_2+1) +$
$46.76 \log (N_3+1) + 6.11 \log (N_4+1)$ wherein $N_1 \ldots N_4$ are the observed ulcer counts of the increasing size groups. Since long term studies in approximately 400 animals show that the average $z$ value for controls is 96.2, with a standard error per group of 6 equal to 18.97, a decrease in the average $z$ score for a given test group, relative to concurrent controls, amounting to 37.5 or more is significant ($P \leq 0.05$); and a compound producing such a decrease is considered anti-ulcerogenic.

This invention will appear more fully from the examples which follow. The examples are given by way of illustration only and are not to be construed as limiting the invention either in spirit or in scope as many modifications both in materials and methods will be apparent to those skilled in the art. In these examples temperatures are given in degrees centigrade (° C.) and quantities of materials in parts by weight unless otherwise noted.

EXAMPLE 1

To a solution of 56.5 parts of potassium metal in 936 parts of tertiary-butyl alcohol is added successively 102 parts of dimethyl oxalate and a solution of 54 parts of 9-oxodecanoic acid in 156 parts of tertiary-butyl alcohol. That addition is carried out over a period of about 40 minutes while the mixture is heated at the reflux temperature in an atmoshpere of nitrogen. At the end of the addition period, heating is continued for about 90 minutes longer and the reaction mixture is cooled and filtered under nitrogen. The filter cake is added to a solution of dilute hydrochloric acid and that mixture is extracted with chlorofrom. The chloroform layer is separated, washed with water, dried over anhydrous sodium sulfate and stripped of solvent under reduced pressure. Recrystallization of the resulting residue from ether affords 2,3,5 - trioxo - 4-methoxalylcyclopentaneheptanoic acid, melting at about 127–129°.

EXAMPLE 2

A mixture containing 50 parts of 2,3,5-trioxo-4-methoxalylcyclopentaneheptanoic acid and 2,880 parts by volume of 2 N hydrochloric acid is slowly distilled in a nitrogen atmosphere for about 2 hours, then is cooled and decolorized with activated carbon. The filtrate thus obtained is concentrated to dryness under reduced pressure and the resulting residue is extracted with ethyl acetate. That organic solution is washed several times with saturated aqueous sodium chloride, then with water and finally dried over anhydrous sodium sulfate and stripped of solvent by distillation under reduced pressure. Recrystallization of the resulting residue from water affords pure 2,3,5-trioxocyclopentaneheptanoic acid, melting at about 102–104°.

EXAMPLE 3

To a solution of 2 parts of 2,3,5-trioxocyclopentaneheptanoic acid in 50 parts of 70% aqueous isopropyl alcohol is added 0.2 part of 5% palladium-on-carbon catalyst and the resulting reaction mixture is shaken with hydrogen at atmospheric pressure and room temperature until 1 molecular equivalent of hydrogen has been adsorbed. The catalyst is removed by filtration and the solvent is distilled under reduced pressure to afford the crude product as a solid residue. Purification by recrystallization from water affords pure 2,5-dioxo-3-hydroxycyclopentaneheptanoic acid, melting at about 127–129.5°.

EXAMPLE 4

To a mixture of 1,000 parts by volume of 1% methanolic hydrogen chloride in 50 parts by volume of 2,2-dimethoxypropane is added 10 parts of 2,5-dioxo-3-hydroxycyclopentaneheptanoic acid and the resulting reaction mixture is stored at room temperature for about 20 hours. At the end of that time the mixture is made alkaline by the addition of excess triethylamine, then is partially concentrated by distillation under reduced pressure. Methanol is added to the residue and the mixture is then concentrated almost to dryness. The resulting residual material is diluted with chloroform and that solution is washed with water, dried over anhydrous sodium sulfate and stripped of solvent under reduced pressure. Purification of the resulting residue by recrystallization from ether affords methyl 2-methoxy-4-hydroxy-5-oxocyclopent-1-eneheptanoate.

The filtrate from the aforementioned ether recrystallization is concentrated to dryness and the resulting residue containing methyl 2-methoxy-3-hydroxy-5-oxocyclopent-1-eneheptanoate is dissolved in 24.5 parts of ether and 3.5 parts of 2,2-dimethoxypropane followed by 4 parts by volume of methanol containing 0.056 part of hydrogen chloride is added. The resulting reaction mixture is stored at 0–5° for about 72 hours and the crystalline material which separates is collected by filtration and dried to afford additional methyl 2-methoxy-4-hydroxy-5-oxocyclopent-1-eneheptanoate.

EXAMPLE 5

To a solution of 2.8 parts of methyl 2-methoxy-4-hydroxy-5-oxocyclopent-1-eneheptanoate in 105.6 parts of dry benzene is added 9.87 parts of N,N-diisopropylethylamine and 0.9 part of chloromethyl methyl ether. The resulting reaction mixture is allowed to stand at room temperature for about 7 hours, at the end of which time an additional 0.9 part of chloromethyl methyl ether is added. That mixture is stored at room temperature for about 16 hours and another 0.9 part portion of chloromethyl methyl ether is added. After the mixture has stood at room temperature for 24 hours longer, 8.8 parts of triethylamine is added and the mixture is stored at room temperature for about 15 minutes, then is diluted with water. The layers are separated and the organic solution is washed with water, dried over anhydrous sodium sulfate and stripped of solvent under reduced pressure to afford methyl 2-methoxy-4-methoxymethoxy-5-oxocyclopent-1-eneheptanoate.

EXAMPLE 6

To a solution of 3.23 parts of methyl 2-methoxy-4-methoxymethoxy-5-oxocyclopent - 1 - eneheptanoate in 146.4 parts of methanol is added 104 parts by volume of 0.1 N aqueous sodium hydroxide and that reaction mixture is stored at 0–5° for about 7 days. At the end of that time most of the methanol is removed by distillation under reduced pressure and the resulting residue is diluted with water, then extracted with benzene-ether. The aqueous layer is cooled to 0–5° and acidified by means of cold dilute aqueous hydrochloric acid. The resulting acidic mixture is extracted with cold ethyl acetate and the layers are separated. The organic layer is washed with water, dried over anhydrous sodium sulfate and stripped of solvent under reduced pressure. The residue thus obtained is dissolved in benzene and that organic solution is washed with several portions of dilute aqueous sodium acetate. The organic layer is separated, washed with water, dried over anhydrous sodium sulfate and concentrated to dryness under reduced pressure. The residual material is dissolved in benzene, then is washed successively with dilute aqueous sodium acetate and water, dried over anhydrous sodium sulfate and stripped of solvent under reduced pressure to afford 2-methoxy-4-methoxymethoxy-5-oxocyclopent-1-eneheptanoic acid.

EXAMPLE 7

To a solution of 0.3 part of (3RS) 1-octyn-3-ol in 53 parts of benzene is added 29.7 parts of dihydropyran and 0.15 part of p-toluenesulfonic acid. The initial exothermic reaction is controlled by cooling in an ice bath and the temperature is thus maintained at about 23°. The resulting reaction mixture is allowed to stand at room temperature for about 5 hours, then is diluted with benzene, washed successively with dilute aqueous sodium hydroxide and water, dried over anhydrous sodium sulfate and stripped of solvent under reduced pressure to afford, as a colorless liquid, (3RS) 1-octyn-3-ol 3-tetrahydropyran-2'-yl ether. It is characterized by infrared absorption maxima, in chloroform, at about 3.01, 3.38, 3.48, 6.58, 6.63, 6.80, 8.90, 9.30, 9.63, 9.80 and 10.21 microns.

EXAMPLE 8

A mixture containing 1 part of 3β-acetoxyandrost-5-ene-17-carboxylic acid and 5 parts of thionyl chloride is allowed to stand at room temperature for about 24 hours, and at the end of that reaction period the mixture is evaporated to dryness under reduced pressure. The resulting residue is dissolved in benzene and the benzene solution is evaporated to dryness under reduced pressure. This procedure is repeated several times in order to remove all of the excess unreacted thionyl chloride. In this manner there is obtained 3β-acetoxyandrost-5-ene-17-carbonyl chloride.

A mixture containing 10.6 parts of the aforementioned 3β-acetoxyandrost-5-ene-17-carbonyl chloride, 3.5 parts of (3RS) 1-octyn-3-ol and 176 parts of benzene is heated at the reflux temperature for about 1 hour. Refluxing is continued after the addition of 2.24 parts of pyridine dissolved in 88 parts of benzene. After 2 hours of additional reflux time the reaction mixture is cooled and filtered and the filtrate is evaporated to dryness by distillation under reduced pressure. The resulting residue is extracted into hexane and that solution is filtered, then kept at −20° for about 16 hours. The crystalline precipitate which forms is collected by filtration, washed on the filter with hexane, then purified by recrystallization from hexane, thus affording white crystals of (3R) 1-octyn-3-yl 3β-acetoxyandrost-5-ene-17-carboxylate, melting at about 116–116.5° and displaying an optical rotation, in chloroform, of −5°.

EXAMPLE 9

3β-acetoxyandrosta-5,16-diene-17-carbonyl chloride is prepared from 3β - acetoxyandrosta - 5,16-diene-17-carboxylic acid and thionyl chloride by the procedure described in Example 8.

A mixture consisting of 10.6 parts of 3β-acetoxyandrosta-5,16-diene-17-carbonyl chloride, 3.5 parts of (3RS) 1-octyn-3-ol and 2.24 parts of pyridine dissolved in 176 parts of benzene is heated at the reflux temperature for about 4 hours, then is cooled and filtered and the filtrate is evaporated to dryness under reduced pressure. The resulting residue is extracted into hexane and that organic solution is filtered, then kept at −20° for about 16 hours. The resulting precipitate is collected by filtration, then purified by recrystallization first from hexane, then from methanol to afford white crystals of (3S) 1-octyn-3-yl 3β-acetoxyandrosta-5,16-diene - 17 - carboxylate, melting at about 124–125° and displaying an optical rotation, in chloroform, of −67°.

A mixture consisting of 34 parts of (3S) 1-octyn-3-yl 3β - acetoxyandrosta-5,16-diene-17-carboxylate, 300 parts by volume of 10% aqueous potassium hydroxide and 240 parts of methanol is heated at the reflux temperature under nitrogen for about 6 hours, then is stirred at room temperature for about 16 hours. Dilution of that mixture with water followed by extraction with pentane affords an organic solution, which is evaporated to dryness under reduced pressure, thus affording (3S) 1-octyn-3-ol, which compound displays an optical rotation, in ether of −21.5°.

EXAMPLE 10

A mixture consisting of 7.5 parts of (3S) 1-octyn-3-ol, 6.7 parts of dihydropyran and 0.1 part of p-toluenesulfonic acid is kept at room temperature for about 5 hours, then is diluted with ether, washed with dilute aqueous potassium carbonate, dried over anhydrous sodium sulfate and stripped of solvent under reduced pressure to afford (3S) 1 - octyn-3-ol 3-tetrahydropyran-2′-yl ether, displaying an optical rotation, in ether, of −44°.

EXAMPLE 11

When an equivalent quantity of (3R) 1-octyn-3-yl 3β-acetoxyandrost-5-ene - 17 - carboxylate is hydrolyzed according to the procedure of Example 9, there is obtained (3R) 1-octyn-3-ol, characterized by an optical rotation of +21.1° in ether.

EXAMPLE 12

The substitution of an equivalent quantity of (3R) 1-octyn-3-ol in the procedure of Example 10 results in (3R) 1-octyn-3-ol 3-tetrahydropyran-2′-yl ether, characterized by an optical rotation, in ether, of +50.5°.

EXAMPLE 13

To a stirred solution of 150 parts of (3RS) 1-octyn-3-ol 3-tetrahydropyran-2′-yl ether in about 1954 parts of dry tetrahydrofuran is added dropwise 283 parts by volume of 3 N ethereal ethyl magnesium bromide while keeping the temperature of the solution below 30°. Stirring is continued for about 1½ hours, after which time 31.5 parts of 2 - methoxy-4-methoxymethoxy-5-oxocyclopent-1-eneheptanoic acid in about 710 parts of dry tetrahydrofuran is added, over a 10 minute period, to the stirred solution. The reactants are allowed to stand for about 16 hours. Then dilute hydrochloric acid is added and the tetrahydrofuran is distilled, while maintaining the temperature below 40°, to reduce the volume of the solution to about ⅓ of its original volume. Benzene is added, and then the organic layer is separated and washed with water. The solvent is evaporated yielding 5 - hydroxy - 5-((3RS) 3-tetrahydropyran-2′-yloxy-1-octynyl) - 4 - methoxymethoxy-2-methoxycyclopent-1 - eneheptanoic acid as an oily residue.

This crude oil is dissolved in 4400 parts of acetone, 1600 parts of water, and 71 parts of concentrated hydrochloric acid and refluxed for 20 hours. The acetone is removed under reduced pressure and then the aqueous solution is extracted with a 1:1 benzene-ether mixture. The benzene-ether solution is extracted with a 5% potassium carbonate solution, and the potassium carbonate solution is acidified and extracted into a benzene-ether solution which is then dried and stripped of solvent. The resulting oil is chromatographed on silicic acid to yield a crystalline material which is triturated with a benzene-ether solution and then recrystallized from ether. The resulting product is 2-((3RS) 3-hydroxy-1-octynyl)-3-hydroxy - 5-oxocyclopent-1-eneheptanoic acid displaying an ultraviolet absorption band at 268 millimicrons and absorption peaks in the infrared at 2.93, 3.39, 5.82 and 6.17 microns. This compound is represented by the following structural formula

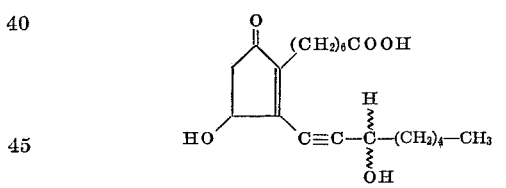

EXAMPLE 14

When an equivalent quantity of (3R) 1-octyn-3-ol-3-tetrahydropyran-2′-yl ether is substituted in the procedure of Example 13, there is obtained 2-((3R) 3-hydroxy-1-octynyl)-3-hydroxy - 5 - oxocyclopent - 1 - eneheptanoic acid. This compound displays an optical rotation, in chloroform, of +14.6° and a melting point at about 82.5–84°.

EXAMPLE 15

Substitution of an equivalent quantity of (3S) 1-octyn-3-ol-3-tetrahydropyran-2′-yl ether in the procedure of Example 13 results in 2-((3S) 3-hydroxy-1-octynyl)-3-hydroxy-5-oxocyclopent-1-eneheptanoic acid, displaying an optical rotation, in chloroform, of −16.5° and a melting point at about 83–84°.

EXAMPLE 16

To a solution of 5 parts of methyl 2-methoxy - 4 - hydroxy-5-oxocyclopent - 1 - eneheptanoate in 120 parts of methanol is added 185 parts of 0.1 N aqueous sodium hydroxide and the resulting reaction mixture is kept at room temperature for about 24 hours, then is stripped of organic solvent by distillation under reduced pressure. The residual mixture is extracted with benzene and the aqueous layer is separated, acidified with dilute hydrochloric acid, then extracted with chloroform. The residual aqueous layer is separated, then extracted with ethyl acetate. The ethyl acetate solution thus obtained is dried over anhydrous sodium sulfate, then concentrated to dryness and the resulting residue is purified by recrystallization from acetone to afford 2-methoxy-4-hydroxy-5-oxocyclopent-1-eneheptanoic acid, melting at about 113.5–117°.

EXAMPLE 17

To 140 parts of (3RS) 1-octyn-3-ol-3-tetrahydropyran-2'-yl ether dissolved in 493 parts of dry tetrahydrofuran is added 180 parts by volume of 3 M ethereal ethyl magnesium bromide over a 45 minute period during which time the temperature is not permitted to rise above 30°. After the addition is complete, the mixture is allowed to stand at room temperature for about 45 minutes. Then 15.4 parts of 2-methoxy-4-hydroxy-5-oxocyclopent-1-eneheptanoic acid in 1332 parts of dry tetrahydrofuran is added, dropwise over a 45 minute period, and the resulting mixture is refluxed for 4½ hours. The reaction mixture is cooled in an ice bath and acidified with dilute hydrochloric acid, and the tetrahydrofuran is removed under reduced pressure. The resulting residue is diluted with ethyl ether and stored at about 5° for about 16 hours. Then the aqueous and organic layers are separated, and the organic layer is extracted with dilute potassium carbonate. The extracts are acidified, washed with water and evaporated to dryness. The residue is dissolved in 119 parts of acetone, and 6.3 parts of methanol and 15 parts by volume of 1 N hydrochloric acid are added. The mixture is allowed to stand at room temperature for 16 hours and then refluxed for 1 hour. The acetone is removed under reduced pressure until about ¼ of the original volume of the solution remains, and water and ethyl acetate are added to form two layers. These layers are separated and the organic portion is washed with water, dried, and stripped of solvent, thus yielding 2-((3RS) 3-hydroxy-1-octynyl)-3-hydroxy - 5 - oxocyclopent-1-eneheptanoic acid which is identical to the product of Example 13.

EXAMPLE 18

To a solution of 83 parts of 3β-acetoxyandrosta-5,16-diene-17-carbonyl chloride and 54 parts of methyl 2-methoxy-4-hydroxy-5-oxocyclopent-1-eneheptanoate in 528 parts of benzene is added 20 parts of pyridine, and the solution is refluxed for 5 hours. After refluxing, the mixture is filtered and then evaporated to dryness under reduced pressure. The resulting residue is treated with 245 parts of pyridine and 50 parts of water, and the mixture is heated on a steam bath for 1 hour. After cooling the mixture, it is diluted with about 715 parts of ether, washed with cold dilute potassium carbonate solution, dried over sodium sulfate, and evaporaed under reduced pressure. The residue is dissolved in methanol, and the mixture is cooled in an ice bath. The precipitate which forms is then recrystallized from methanol to yield the pure product, 1-(6-methoxycarbonylhexyl) - 2 - methoxy-5-oxocyclopent-1-en-4-yl 3β - acetoxyandrosta-5,16-diene-17-carboxylate, melting at about 159.5–160.5° and displaying an optical rotation, in chloroform, of −80°.

EXAMPLE 19

To 1.0 part of 2-((3RS) 3-hydroxy-1-octynyl)-3-hydroxy - 5 - oxocyclopent-1-eneheptanoic acid dissolved in methanol, there is added dropwise a 5% ethereal diazomethane solution until a slight excess of diazomethane is present. That excess is detected when the solution exhibits a persistent yellow color. The solution then is evaporated to dryness under a nitrogen atmosphere to yield methyl 2 - ((3RS) 3 - hydroxy-1-octynyl)-3-hydroxy-5-oxocyclopent-1-eneheptanoate as an oil.

EXAMPLE 20

By substituting an equivalent quantity of diazoethane in the procedure of Example 19, there is obtained ethyl 2-((3RC) 3-hydroxy-1-octynyl)-3-hydroxy-5-oxocyclopent-1-eneheptanoate as an oil.

EXAMPLE 21

A solution consisting of 55 parts of (3RS) 3-methyl-1-octyn-3-ol 3-tetrahydropyran-2'-yl ether and 355 parts of tetrahydrofuran is treated with 80 parts by volume of a 3 M ethereal magnesium bromide solution. That addition takes place dropwise over a 45 minute period and the temperature of the reaction mixture is not allowed to exceed 30°. After the addition is complete, the mixture is allowed to stand at room temperature for 45 minutes. Then a solution of 10.0 parts of 4-hydroxy-2-methoxy-5-oxocyclopent-1-eneheptanoic acid in 890 parts of tetrahydrofuran is added dropwise over a 45 minute period. The resulting reaction mixture is heated at reflux temperature for 5½ hours and then allowed to stand at room temperature for about 16 hours. After that time, the mixture is cooled in an ice bath and acidified with dilute hydrochloric acid. The solvent is removed under reduced pressure, and the residue which remains is dissolved in ethyl ether-benzene, washed with water and stripped of solvent. The material which remains is dissolved in 260 parts of acetone and treated with 125 parts by volume of 1 N hydrochloric acid solution. That mixture is allowed to stand at room temperature for 18 hours, and then the solvent is removed under reduced pressure. The remaining material is dissolved in ethyl acetate and washed with water. The organic layer is extracted with 1% aqueous sodium carbonate to afford material, which when chromatographed on silicic acid with 75:25 ethyl acetate-benzene as eluant, affords pure 3-hydroxy-2-((3RS) 3-hydroxy-3-methyl-1-octynyl)-5-oxocyclopent-1-eneheptanoic acid, melting at about 58.5–60.5°. That compound is characterized by absorption in the ultraviolet spectrum at about 269 millimicrons and absorption maxima in the infrared spectrum at about 3.2, 3.3, 3.4, 5.6 and 6.2 microns. It is represented by the following structural formula

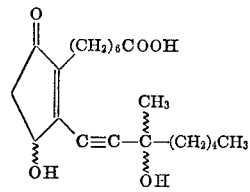

EXAMPLE 22

1 part of 3-hydroxy - 2 - ((3S) 3-hydroxy-1-octynyl)-5 - oxocyclopent - 1 - eneheptanoic acid, dissolved in 3.2 parts of methanol, is treated with 30 parts by volume of 0.1 N aqueous sodium hydroxide solution. The reaction mixture is cooled in an ice bath and treated with 0.108 part of sodium borohydride, then allowed to remain at 0° for about 6½ hours. After that time, the reaction mixture is diluted with ethyl acetate and the organic and aqueous layers are separated. The aqueous layer is diluted again with ethyl acetate and acidified with cold dilute sulfuric acid. The organic layers are combined and washed with water, dried over anhydrous sodium sulfate and stripped of solvent. The material which remains is recrystallized from ethyl acetate to afford pure 3,5-dihydroxy - 2 - ((3S) 3-hydroxy - 1 - octynyl) cyclopent-1-eneheptanoic acid. That compound melts at about 107–111°, absorbs in the ultraviolet spectrum at about 233 millimicrons, exhibits maxima in the infrared spectrum at about 3.3, 7.8, 9.0, 9.5 and 12 microns and is represented by the following structural formula

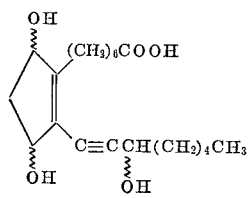

EXAMPLE 23

A solution of 88.0 parts of (3RS) 1-heptyn-3-ol 3-tetrahydropyran-2'-yl ether dissolved in 400 parts of tetrahydrofuran is treated with 123 parts by volume of a 3 M ethereal magnesium bromide solution. That addition is accomplished dropwise over a 45 minute period and the temperature of the reaction mixture is not allowed to exceed 30°. After the addition is complete, the mixture is allowed to stand for 45 minutes. Then 10.0 parts of 4-hydroxy - 2 - methoxy - 5 - oxocyclopent-1-eneheptanoic acid in 890 parts of tetrahydrofuran is added dropwise over a 45 minute period. The resulting reaction mixture is refluxed for a total of 6 hours, then cooled in an ice bath and diluted with aqueous hydrochloric acid until acidic. Then the solvent is removed under reduced pressure at room temperature. The residue which remains is diluted with ethyl acetate-benzene and water and the organic and aqueous layers which form are separated. The organic layer is washed with water and stripped of solvent. The material which remains is dissolved in 300 parts of acetone and treated with 140 parts by volume of 1 N aqueous hydrochloric acid. That mixture is allowed to stand at room temperature for 48 hours, and then the acetone is removed under reduced pressure. The residue is dissolved in ethyl acetate and washed with water. The organic layer then is extracted with 1% aqueous potassium carbonate, acidified with dilute aqueous hydrochloric acid and extracted with ethyl acetate. After washing with water and drying over anhydrous sodium sulfate the solvent is stripped to yield crude material, which when chromatographed on a silicic acid column using 75:25 ethyl acetate-benzene as eluant, yields pure 3-hydroxy - 2 - (3-hydroxy-1-heptynyl)-5-oxocyclopent-1-eneheptanoic acid. That compound melts at about 76–79°, exhibits an absorption band in the ultraviolet spectrum at about 270 millimicrons and absorption maxima in the infrared spectrum at about 3.4, 3.45, 5.8, 7.95 and 12.5 microns and is represented by the following structural formula

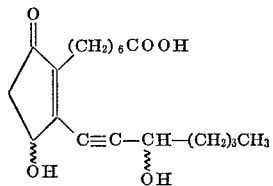

EXAMPLE 24

By substituting an equivalent quantity of 10-oxoundecanoic acid in the procedure of Example 1 and otherwise following the procedures of Examples 1, 2 and 3, there is produced 2,5-dioxo - 3 - hydroxycyclopentaneoctanoic acid, melting at about 143.5–144°.

EXAMPLE 25

When an equivalent quantity of 2,5-dioxo-3-hydroxycyclopentaneoctanoic acid is substituted in the procedure of Example 4, there is produced methyl 4-hydroxy-2-methoxy - 5 - oxocyclopent - 1 - eneoctanoate, melting at about 91.5–92.5°.

EXAMPLE 26

Substitution of an equivalent quantity of 4-hydroxy-2-methoxy-5-oxocyclopent - 1 - eneoctanoic acid in the procedure of Example 17 affords 3-hydroxy-2-((3RS) 3-hydroxy - 1 - octynyl) - 5 - oxocyclopent-1-eneoctanoic acid, melting at about 80–82°. That compound is characterized by an absorption band in the ultraviolet spectrum at about 268 millimicrons and absorption maxima in the infrared spectrum at about 3.38, 3.4, 3.5, 5.8, 8.0, 9.5 and 12.5 microns.

EXAMPLE 27

By substituting an equivalent quantity of (1RS) 1-ethynylcylohexan-1ol- in the procedure of Example 7, there is afforded (1RS) 1-ethynylcyclohexan-1-ol 1-tetrahydropyran-2'-yl ether.

EXAMPLE 28

Substitution of an equivalent quantity of 1-ethynylcyclohexan-1-ol 1-tetrahydropyran-2'-yl ether in the procedure of Example 23 affords, after chromatography on silicic acid with the eluant being 75% ethyl acetate-chloroform, 3-hydroxy - 2 - (2-[1-hydroxycyclohexyl]ethynyl)-5-oxocyclopent - 1 - eneheptanoic acid hemihydrate. That compound is represented structurally by the following formula

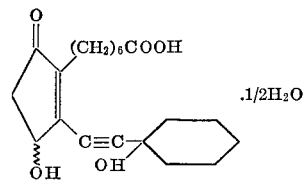

EXAMPLE 29

When an equivalent quantity of (3RS) 3-ethyl-1-octyn-3-ol 3-tetrahydropyran-2'-yl ether is substituted in the procedure of Example 21, there is afforded 3-hydroxy-2-((3RS) 3 - ethyl-3-hydroxy-1-octynyl)-5-oxocyclopent-1-eneheptanoic acid.

EXAMPLE 30

0.500 part of 2,3,5-trioxocyclopentaneheptanoic acid is treated with a solution of 10 parts of water and 0.166 part of sodium hydroxide. After dissolution of the triketone is complete, the solution is cooled in an ice bath and 0.021 part of sodium borohydride is added. The reaction mixture is allowed to stand in the ice bath for 1½ hours. Then ether is added to afford 2 phases which are separated. The aqueous phase is acidified with cold dilute hydrochloric acid, accompanied by simultaneous addition of ethyl acetate, until the mixture is slightly acidic. The organic and aqueous layers are separated and the organic layer is washed with water, dried over anhydrous sodium sulfate and stripped of solvent. Crystallization from water then yields pure 3-hydroxy-2,5-dioxocyclopentaneheptanoic acid. That compound is identical to the product of Example 3.

What is claimed is:
1. A compound of the formula

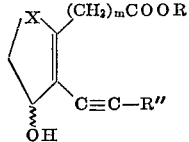

wherein R is hydrogen or a lower alkyl radical, R'' is a 1-hydroxycyclopentyl radical, a 1-hydroxycyclohexyl radical or a radical of the formula

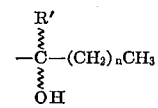

with R' being hydrogen or a lower alkyl radical containing 1 to 7 carbon atoms and $n$ being an integer greater than 1 and less than 7, X is a carbonyl or hydroxymethylene radical, $m$ is an integer greater than 5 and less than 8 and the wavy lines represent the R or S configuration or the racemic mixture.

2. As in Claim 1, a compound of the formula

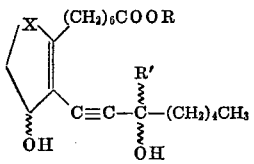

wherein R, R' and X are defined as in Claim 1.

3. As in Claim 1, a compound of the formula

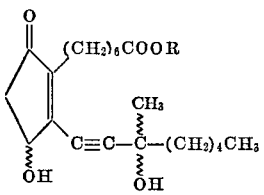

wherein R is hydrogen or a lower alkyl radical.

4. As in Claim 1, a compound of the formula

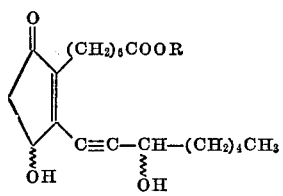

wherein R is hydrogen or a lower alkyl radical.

5. As in Claim 1, a compound which is 2-((3RS) 3-hydroxy - 1 - octynyl)-3-hydroxy-5-oxocyclopent-1-eneheptanoic acid.

6. As in Claim 1, a compound which is levorotatory 2-((3RS) 3 - hydroxy-1-octynyl)-3-hydroxy-5-oxocyclopent-1-eneheptanoic acid.

7. As in Claim 1, a compound which is dextrorotatory 2-((3RS) 3 - hydroxy-1-octynyl)-3-hydroxy-5-oxocyclopent-1-eneheptanoic acid.

8. As in Claim 1, a compound which is methyl 2-((3RS) 3 - hydroxy - 1 - octynyl)-3-hydroxy-5-oxocyclopent-1-eneheptanoate.

9. As in Claim 1, a compound which is levorotatory methyl 2-((3S) 3 - hydroxy-1-octynyl)-3-hydroxy-5-oxocyclopent-1-eneheptanoate.

10. As in Claim 1, a compound which is dextrorotatory methyl 2 - ((3R) 3 - hydroxy-1-octynyl)-3-hydroxy-5-oxocyclopent-1-eneheptanoate.

11. As in Claim 1, a compound which is 2-((3RS) 3-hydroxy - 3 - methyl-1-octynyl)-3-hydroxy-5-oxocyclopent-1-eneheptanoic acid.

12. As in Claim 1, a compound which is 2-((3RS) 3-hydroxy - 1 - heptynyl)-3-hydroxy-5-oxocyclopent-1-eneheptanoic acid.

13. As in Claim 1, a compound which is 3-hydroxy-2-(2-[1-hydroxycyclohexyl]ethynyl) - 5 - oxocyclopent-1-eneheptanoic acid.

References Cited

Prostaglandins, Sept. 17, 1969, New York.

LORRAINE A. WEINBERGER, Primary Examiner

R. GERSTL, Assistant Examiner

U.S. Cl. X.R.

260—413, 468 D, 514 D, 514 K; 424—305, 317